June 6, 1944.  W. W. SMITH  2,350,424
AIRCRAFT NAVIGATION DEVICE
Filed July 24, 1941

INVENTOR.
Wallace W. Smith
BY Casper L. Redfield
Atty.

Patented June 6, 1944

2,350,424

UNITED STATES PATENT OFFICE 2,350,424

AIRCRAFT NAVIGATING DEVICE

Wallace W. Smith, Chicago, Ill.

Application July 24, 1941, Serial No. 403,882

6 Claims. (Cl. 33—76)

My invention relates to instruments to be used in the navigation of air crafts. Its primary object is to make a device which may be of comparatively small size and easy to operate, and one in which the human error will be reduced to a negligible quantity. One way of reducing the human error is to make the graduations on the different scales of approximately the same dimensions so that they can be read with equal accuracy.

A further object is to produce a device which will solve all of the problems involved in navigating an air craft in a straight line in a given direction thru moving air, and have those solutions standing so that they can be consulted at any time. If a change is discovered in either the speed or direction of the wind, the navigator can make the necessary correction in the setting of the device upon learning those two facts about the wind.

Figure 1:
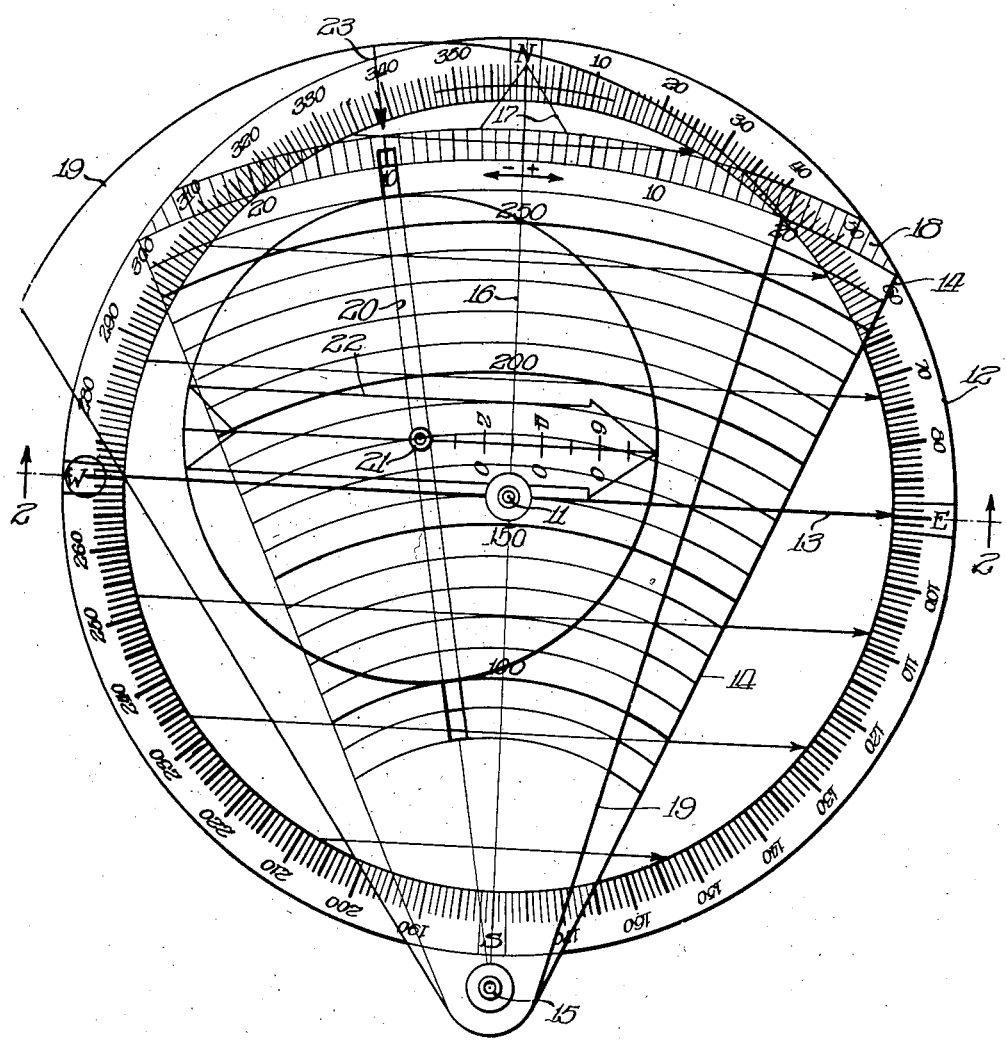
Figure 2:
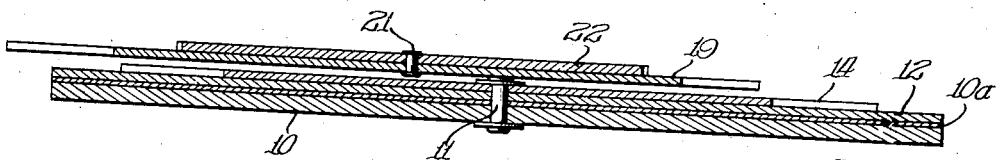

In the accompanying drawing:

Fig. 1 is a plan of the device set for a solution which will be explained hereinafter; and Fig. 2 is a section on line 2—2 of Fig. 1.

In said drawing, 10 is a base on which is secured a dial 10a graduated in degrees. Secured to base 10, is a central pivot 11 on which the other parts are movable. Mounted directly on pivot 11, is a disk or wind dial 12 which permits the compass graduations on base 10 to be read. Running diametrically across disk 12, is a red, or otherwise distinguishable, center line 13, having a circle at one end and an arrow at the other end for indicating the direction in which the wind is blowing at the time the device is being set for the solution of some problem. Parallel with line 13 are other uniformly spaced red lines, the purpose of which will become evident in describing the operation of the device.

Also mounted upon pivot 11, is an independently movable ground segment 14 of transparent material. This segment is approximately in the form of a sector, the arcuate portion of which matches the base on which it is mounted. Near its apex, and preferably just beyond the base 10, is a pivoting pin 15. Passing thru pins 15 and 11, is a center line 16 which has an arrow 17 marked on its end for the purpose of setting the ground segment to indicate the direction of the destination from the point of departure.

With pin 15 as a center, arcs are drawn to represent miles per hour on any radial line from center 15. Preferably, the spaces representing fifty miles are in black or heavy lines, and intermediate graduations are in red or lighter lines. These heavy lines are marked 100, 150, 200 and 250. Beyond the graduations representing miles per hour, is a partial compass dial 18 graduated in degrees each way from the center line 16.

Pivoted on the pin 15 is an air segment 19 which may be of the same size and shape as segment 14, or may be a smaller sector. This segment has a radial slot 20 in which is an adjustable eyelet 21 thru which may be read miles per hour, as indicated by the arcs on segment 14.

Pivoted on the eyelet 21 is a wind direction arrow 22 having a center line graduated from its pivot in miles per hour on the same scale as are the arcs on the ground segment 14 about the pivot 15. This arrow is comparatively long and has a width equal to about two-thirds of the distance between the parallel lines on the disk 12. The purpose of this is to make it impossible to have the pivoting eyelet 21 at any place in which its center line or edges will not be near a red line on disk 12 which will assist in the accurate setting of the arrow 22 to represent the direction which the wind is blowing.

The navigator of an air craft knows the distance and direction of his destination from the point he leaves, and he makes a practice of driving the craft at some particular speed thru the air unless there are special reasons why he should go faster or slower. With an adopted air speed for the craft, the distance he can travel on the predetermined track depends upon the direction of the wind and the velocity with which it blows. These he can obtain from the meteorological reports.

A convenient way of getting familiar with the operation of this device is to begin with the case in which the direction of the wind is perpendicular to the track to be followed, and then consider variations of that direction.

Assume the destination to be in any direction, as north, which is zero degrees on the compass, and that the speed of the craft is to be 180 miles per hour. Also assume that the wind velocity is 30 miles per hour from the west to the east.

First adjust the wind dial 12 so that its center line 13 will have its circle at "W" and its arrow at "E" on the compass. Next adjust the ground segment 14 so that the arrow 17 at the end of its center line will point to "N" on the compass. Then adust the center of the eyelet 21 so that it coincides with that arc on the ground segment 14, which represents 180 miles per hour. Then adjust the air segment 19 and arrow 22 so that the arrow will point in the direction in which the wind is blowing and has its graduation 30 on the center line 16 of the ground segment 14.

There is then set up on the instrument a triangle in which the wind velocity is the sine of an angle in which the radius is the air speed, and the ground speed is the cosine. The arrow 23 at the end of the center line of the air segment will show what this angle is. Under the conditions assumed, this angle turns out to be practically nine and one-half degrees on the compass dial 18, which means that the navigator should steer his air craft nearly ten degrees to windward from the direction of the track leading to his destination. This angle is called the "correction angle."

With a change of wind velocity, other things remaining the same, it is only necessary to adjust the air segment 19 to make the proper graduation on the wind arrow match the track of the craft, and taking care that the wind arrow properly indicates the direction of the wind. The arrow on the air segment will indicate the new correction angle.

For a change in the direction of the wind, other things remaining the same, shifting the mark for 30 inward or outward on the center (track) line 16, and keeping the wind arrow parallel with the direction of the wind, will result in shifting the center line of the air segment 19 toward the center line of the ground segment and thus reduce the correction angle until it becomes zero when the two lines coincide.

When a pilot travels frequently over a certain track, there are landmarks which he can recognize. If he finds himself to leeward of a point over which he should pass, he knows that the wind velocity has increased. If at windward, he knows that it has died down. In either case, he can estimate how much, and can adjust the air segment to bring a changed part of the wind arrow to match the center line representing the track to be followed. That will give him a modified compass course.

When starting, the wind arrow tells him the ground speed he is to make. If he finds himself going faster or slower, he knows that the wind direction has shifted to accelerate or retard his progress. He then shifts the wind arrow on its pivot to make the original marking match the real distance traveled. That will give him a new compass direction, unless the wind velocity has also changed.

In this connection, it is proper to remember that a wind velocity of 30 miles an hour is classed as a high wind, and that a velocity of 40 miles per hour is classed as a very high storm. As the normal air speed of an air craft is much greater than any possible air velocity, the length of the line representing air speed dominates any triangle for solving navigating problems, and that air velocity is the least factor.

What I claim is:

1. A base representing a compass graduated in degrees, a disk pivoted at its center and permitting said graduations to be seen, said disk having parallel lines thereon suitably marked to indicate wind direction and adapted to cooperate with the compass graduations, a ground segment pivoted at the same center and carrying a pivoting pin removed a considerable distance from its own pivot, the line passing thru said pivots being provided with means for indicating its position with respect to the compass graduations, said line being graduated to represent miles per hour, a second segment adjustable on the pivot carried by the first segment, and having a radial slot therein, an eyelet adjustable in said slot, and a wind arrow pivotably adjustable on said eyelet and having graduations to represent miles per hour drawn at the same scale as those on the ground segment.

2. In an air navigating device, a base having a compass graduated in degrees, a member pivoted at the center of the compass and having a center line for indicating a track to be followed, said center line being graduated to represent miles per hour, a second member pivoted to the first member and having a radial slot serving as a guide, a wind arrow provided with a pivot adjustable in said guide and having means by which the relationship of said pivot to said graduations may be observed, said arrow having a center line graduated in miles per hour, any graduation of which may be made to coincide with the center line of the first member.

3. In an air navigating device, a base providing compass graduations, a member pivoted at the center of the compass and provided with a center line for setting it to indicate direction of destination, a second member pivoted to the first member to indicate steering direction, and a wind direction arrow connected to and pivotally adjustable along a center line on the second member, said arrow having a center line of its own, and said movable parts carrying graduations by which, upon adjusting them to form any triangle, the lengths of the sides thereof will be readable upon said graduations in miles per hour.

4. In an air navigating device, a base providing compass graduations, a member pivoted at the center of the compass and having a center line extending in both directions from said pivot, a second member pivoted on the center line of the first member and at a point remote from the pivot of the first member and having a long radial slot therein, an eyelet adjustable in said slot, and a wind arrow pivoted on said eyelet and having graduations thereon, said second member and said arrow being adjustable to make any graduation on the arrow coincide with the center line on the first member.

5. In a device of the class described, a base providing a compass graduated in degrees, a disk pivoted at the center of the base and having uniformly spaced parallel lines thereon to indicate wind direction in cooperation with the compass graduations, a guide pivoted near the circumference of the base and movable over said parallel lines, an eyelet adjustable in said guide, and a wind arrow pivotably adjustable on said eyelet to a position parallel with said parallel lines, said wind arrow having a center line and a width equal to about two-thirds of the distance between adjacent parallel lines.

6. A base providing compass graduations and a central pivot, a plane surface mounted upon said pivot and supporting a second pivot adjacent to the compass graduations, said plane surface having graduations thereon, a guide supported above said surface and extending transversely with regard to the graduations on said plane surface, an eyelet adjustable in said guide, said eyelet having a small round opening thru which said graduations may be seen for adjusting purposes, and an indicating device secured to said eyelet.

WALLACE W. SMITH.